United States Patent [19]

Barkans

[11] Patent Number: 5,220,650
[45] Date of Patent: Jun. 15, 1993

[54] HIGH SPEED METHOD FOR RENDERING ANTIALIASED VECTORS

[75] Inventor: Anthony C. Barkans, Ft. Collins, Colo.

[73] Assignee: Hewlett-Packard Company, Palo Alto, Calif.

[21] Appl. No.: 644,188

[22] Filed: Jan. 22, 1991

[51] Int. Cl.$^5$ ............................................. G06F 15/16
[52] U.S. Cl. .................................... 395/163; 395/162; 395/143; 364/DIG. 1; 364/DIG. 2; 364/931.41; 340/750
[58] Field of Search ... 364/518, 521, 522, 200 MS File, 364/900 MS File; 340/747, 750; 395/162, 163, 141, 142, 143

[56] References Cited

U.S. PATENT DOCUMENTS

| | | | |
|---|---|---|---|
| 4,908,780 | 3/1990 | Priem et al. | 364/521 |
| 4,918,626 | 4/1990 | Watkins et al. | 364/522 |
| 4,996,653 | 2/1991 | Butler et al. | 364/521 |
| 5,036,453 | 7/1991 | Renner et al. | 364/200 |
| 5,043,880 | 8/1991 | Yoshida | 364/200 |
| 5,043,883 | 8/1991 | Inouchi et al. | 364/200 |

OTHER PUBLICATIONS

A. C. Barkans, "High Speed High Quality Antialiased Vector Generation," *Computer Graphics*, vol. 24, No. 4, Aug. 1990.

W. Newman and R. Sproull, *Principles of Interactive Computer Graphics*, pp. 24-27, 2nd ed. McGraw-Hill, New York, 1979.

*Fundamentals of Interactive Computer Graphics*, Chs. 11,12 J. D. Foley and A. Van Dam, ISBN: 0-201-144-68-9.

"Filtering Edges for Gray-Scale Displays," *Computer Graphics*, vol. 15, No. 3 (Aug. 1981).

T. Duff, "Compositing 3-D Rendered Images," *San Francisco* Jul. 22-26, vol. 19, No. 3 (1985).

Akira Fujimoto and Kansei Iwata, "Jag-Free Images on Raster Displays," *IEEE Computer Graphics & Applications*, (Dec. 1983).

J. E. Bresenham, "Algorithm for computer control of a digital Plotter," *IBM Systems Journal*, vol. 4, No. 1 (1965).

James F. Blinn, "What We Need Around Here Is More Aliasing," *IEEE Computer Graphics & Applications*, (1989).

James F. Blinn, "Return of the Jaggy," *IEEE Computer Graphics & Applications*, (Mar. 1989).

David Oakley, "Dejagging Raster Graphics by Pixel Phasing," *SID 86 Digest*, (1986).

Primary Examiner—Gary V. Harkcom
Assistant Examiner—Phu K. Nguyen
Attorney, Agent, or Firm—Guy J. Kelley

[57] ABSTRACT

A scan conversion algorithm for rendering antialiased vectors in a multi-processor graphics system comprises the following steps: providing signals to the processors indicative of scan lines the respective processors are responsible for, determining a first set of storage pixels to be rendered by the processors, rendering such storage pixel of the first set simultaneously, each by a different processor, determining a second set of storage pixels to be rendered, and rendering each of the second set of storage pixels substantially simultaneously by a different one of the processors. The determinations of the first and second sets of storage pixels are made in accordance with the signals indicative of scan lines for which the respective processors are responsible.

27 Claims, 7 Drawing Sheets

FIG. 6(a)

```
DETERMINE:   AA_MODE
             MAJ_DEC
             Y_MAJOR
             MAJOR_START
             MAJOR_COUNT
             MINOR_START
             MINOR_SLOPE
             MIN_I
             MIN_O
             MAJ_I
             MAJ_O
             S0
             S1
             S2
             S3
             2_PP
             4_PP
             STEP_CONTROL
             SERP
             INCREMENT
             DECREMENT
             HOLD
             MINOR_STEP
```

(A)

HIGH SPEED METHOD FOR RENDERING ANTIALIASED VECTORS

FIELD OF THE INVENTION

The present invention relates generally to the field of computer graphics. More particularly, the present invention is related to scan conversion methods and corresponding apparatuses for rendering antialiased vectors in an interactive computer graphics system. Still more particularly, the present invention is related to a high speed scan conversion method that can be carried out by one processor or a plurality of parallel processors.

BACKGROUND OF THE INVENTION

The field of computer graphics concerns the creation, storage, manipulation and display of pictures and models of objects by a digital processor. Interactive computer graphics is the subclass of computer graphics in which a user dynamically controls the picture's content, format, size or color on a display surface by means of an interaction device such as a keyboard, lever or joystick. See *Fundamentals of Interactive Computer Graphics*, by J. D. Foley and A. Van Dam, ISBN: 0-201-14468-9. The creation of synthetic images (i.e., images which exist as abstract collections of lines, points, curves, etc., in the computer's memory) is the usual domain of interactive computer graphics.

There are two primary classes of interactive computer graphics systems: random-scan and raster-scan systems. Images displayed by a random-scan system are encoded as commands to draw each output primitive (i.e., point, line or polygon) by plotting individual points or drawing connecting lines between specified starting and ending coordinates of line segments. Polygons are simply treated as a closed series of line segments. Encoding for a raster-scan system is much simpler: output primitives are broken up into their constituent points for display. The major difference between a simple point-plotting random-scan system and a raster-scan system is in the organization of the stored data used to drive the display. As explained below, the data is stored in a "frame buffer" (also called a "refresh buffer").

In the random-scan system, the component points of each successive output primitive are stored sequentially in memory and are plotted in that order, one point at a time. This is because the beam may be moved randomly on the screen. In the raster-scan system, the refresh memory is arranged as a 2-dimensional array of data. The value stored at a particular row and column encodes an intensity and/or color value of a corresponding display element on the screen. By convention, the location of each display element is specified by a unique (X,Y) coordinate.

Since each memory location defines a single point-sized element of an image, both the display screen location and its corresponding memory location are often called a "pixel," short for the image processing term "picture element." Hereinafter, to avoid confusion, we'll use the term "display pixel" to indicate picture elements of a display device, and "storage pixel" to indicate memory locations corresponding to the display pixels.

FIG. 1 is a simplified block diagram of a raster-scan graphic system 10. Such a system includes an image creation system 12, an image storage system 14 (such as a frame buffer), an image display system 16, a raster-scan display 18 and an interaction device 20. The image creation system 12 converts output primitives into the data stored in the frame buffer of the image storage system 14. The processing speed of the image creation system 12 establishes most of the characteristics of the raster-scan system 10. Moreover, the image creation system 12 is particularly malleable because it is typically implemented with a microprocessor. See Chapter 12 of *Fundamentals of Interactive Computer Graphics*, referenced above.

The overall speed with which all or part of the stored image data can be changed is dependent upon, among other things, how fast the image creation system executes instructions. It is the image creation system's execution of instructions which is often the slowest process in creating or changing an image. This is because the "scan conversion" algorithm (described below) typically requires many iterations. Usually, the faster the scan conversion algorithm, the faster the overall system response time to user commands. In addition, it is known that response time is critical to user satisfaction and, perhaps more importantly, to user productivity.

The process of converting a line, point, and area representation of an image to the array of pixel data in the image storage system 14 is called "scan conversion." Scan conversion algorithms are always needed in an interactive raster-scan graphics system, and are usually incorporated into the image creation system 12. The scan conversion algorithm used in a raster-scan graphics system will be invoked quite often, typically hundreds or even thousands of times, each time an image is created or modified. Hence, it must not only create visually pleasing images, but must also execute as rapidly as possible. Indeed speed versus image quality is the basic tradeoff in known scan conversion algorithms. Some scan conversion algorithms are fast and give jagged edges, while others are slower but give smoother edges. However, it can generally be said that faster is better for a given smoothness of image.

FIG. 2 depicts an exemplary line, $y = mx + b$, along with a vector 22 as it might be rendered (i.e., stored) in the frame buffer of the image storage system 14. Vector 22 is composed of a set of display pixels $P_0, P_1, P_2, \ldots P_N$ driven by a corresponding set of storage pixels in the image storage system 14. Vector 22 is rendered by stepping along the major axis, in this case the X-axis, and computing corresponding minor axis (Y-axis) ordinate values. These (X,Y) coordinates define the storage and display pixels composing the vector 22. The basic task in scan converting a line is to compute the integer coordinates of the display pixels lying nearest the line.

As can be seen from vector 22, the limited resolution of the frame buffer 14 and display device 18 causes the vector to become jagged, or "aliased." Techniques for generating antialiased (i.e., smooth) vectors are known in the art. See, for example, Chapter 11.2.3 of *Fundamentals of Interactive Computer Graphics*, referenced above, and references cited therein for details of known antialiasing techniques. These known antialiasing techniques are too slow for many applications however, although they may produce visually acceptable images.

FIGS. 3(a) and 3(c) depict two sets of vectors. The end point description of the set shown in FIG. 3(a) is a simple horizontal translation of the end point description of the set shown in FIG. 3(c). Both sets of vectors have a slope of 1/200. The vectors of FIG. 3(a) have been filtered, i.e., are antialiased, while the vectors of FIG. 3(c) are aliased.

The spatial aliasing shown by the unfiltered set of vectors in FIG. 3(c) is not the only aliasing problem in computer generated graphics. Another aliasing problem is shown in FIGS. 3(b) and 3(d). The vectors shown in FIG. 3(b) are the same as those in FIG. 3(a), and the vectors shown in FIG. 3(d) are the same as those shown in FIG. 3(c), with the exception that the vectors shown in FIGS. 3(b) and 3(d) have been translated vertically by one-half of a pixel. If these two sets of aliased and antialiased vectors are displayed as part of a real time series, then the antialiased vectors would have the correct apparent motion; that is, the antialiased vectors would appear to be slowly moving up. On the other hand, the aliased vectors would appear to be moving quickly in the horizontal direction. The arrow in FIG. 3(d) points to a step in the displayed pixels. This step is noticeably offset from the equivalent step in FIG. 3(c). It is the motion of these steps that dominate the apparent motion of the unfiltered vectors in the real time series. In other words, the image on the right would appear to be moving at the wrong speed in the wrong direction. This artifact is called "aliasing-induced motion." A viewer sees a combination of all aliasing artifacts, including those due to both spatial aliasing and aliasing-induced motion. As pixel rendering speed increases and the goal of real-time generation of images is approached, aliasing-induced motion becomes greater and the total aliasing problem becomes more troublesome. See A. C. Barkans, "High Speed High Quality Antialiased Vector Generation," *Computer Graphics*, Vol. 24, Number 4, August 1990, which is incorporated herein by reference.

Users of interactive graphics systems now expect vector generation to be fast enough to support the real time display of user-controlled complex images. This has unfortunately aggravated the aliasing problem since aliasing-induced motion is added to the formerly dominant static spatial aliasing.

SUMMARY OF THE INVENTION

Accordingly, an object of the present invention is to provide an efficient and rapid method and apparatus for rendering antialiased vectors. A further object of the present invention is to provide a high speed method for rendering antialiased vectors that can be carried out by a number of processors running in parallel. The present invention achieves these goals.

According to the invention, a scan conversion method for rendering an antialiased vector in a multi-processor graphics system comprises the following steps.

First, signals are provided to the processors indicative of display areas for which the respective processors are responsible. Next, a first set of storage pixels to be rendered by the processors is determined. Next, each storage pixel of the first set is rendered simultaneously, each by a different processor. Finally, a second set of storage pixels to be rendered is determined, and each pixel of the second set of storage pixels is rendered substantially simultaneously by a different one of the processors. The determinations of the first and second sets of storage pixels are made in accordance with the signals. Each pixel in a given set of pixels corresponds either to different minor axis steps along a given major axis step (for Y-major vectors) or to different major axis steps along a given minor axis step (for X-major vectors), depending upon whether the major axis is the X or Y axis.

In a second embodiment, an apparatus is provided for carrying out the above method steps.

In a third embodiment, a multi-processor computer graphics system is provided. The system comprises an image creation system, a frame buffer comprising storage pixels for storing pixel data rendered by the image creation system, and a raster-scan display for displaying pixel data stored in the frame buffer. The image creation system comprises a plurality of parallel processors for rendering the vector; means for providing signals to each of the processors indicative of display areas the respective processors are responsible for; means for determining in accordance with the signals a first set of storage pixels to be rendered by the processors, and for rendering each pixel of the first set simultaneously by a different one of the processors; and means for determining in accordance with the signals a second set of storage pixels to be rendered by the processors, and for rendering each of the second set of pixels simultaneously by a different one of the processors.

Where the vector's major axis is along the X-axis, each of the pixels in the first set corresponds to a single major axis step. Where the vector's major axis is along the Y-axis, each of the pixels in the first set corresponds to a different major axis step.

BRIEF DESCRIPTION OF THE DRAWINGS

FIGS. 6(a)-5(c) are a flowchart of a scan conversion method in accordance with the present invention.

DETAILED DESCRIPTION OF THE PREFERRED EMBODIMENTS

The preferred embodiments will now be described with reference to the drawings, wherein like numerals designate like elements or steps.

Figure 1:
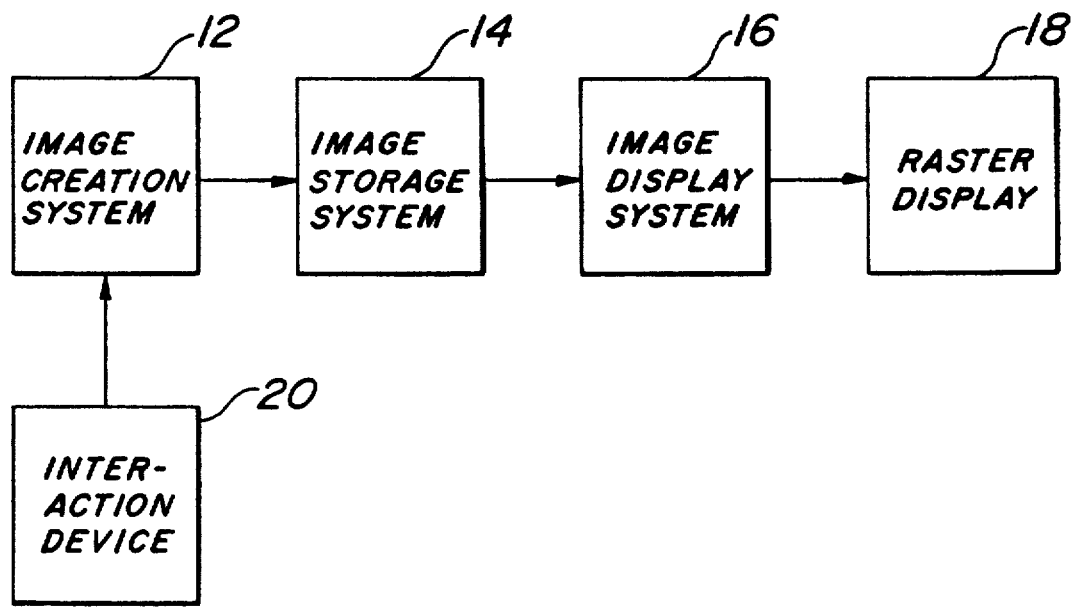
FIG. 1 is a block diagram of a known basic raster-scan graphics system.
Figure 3A:
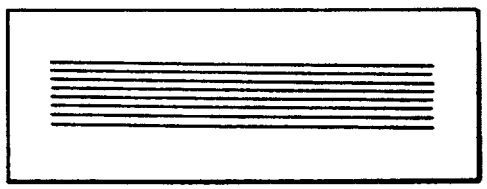
FIGS. 3(a) and 3(c) depict a set of antialiased vectors and a corresponding set of aliased vectors, respectively.
Figure 3B:
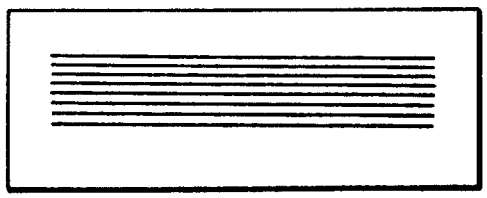
FIGS. 3(b) and 3(d), depict the same sets of antialiased and aliased vectors depicted in FIGS. 3(a) and 3(c), but shifted up one-half pixel.
Figure 3C:
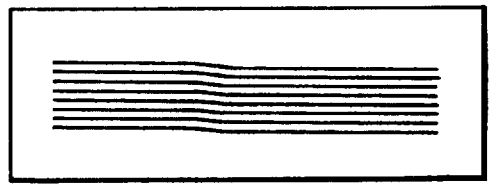
Figure 3D:
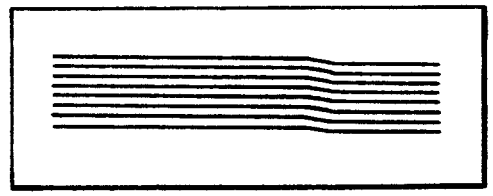
Figure 4A:
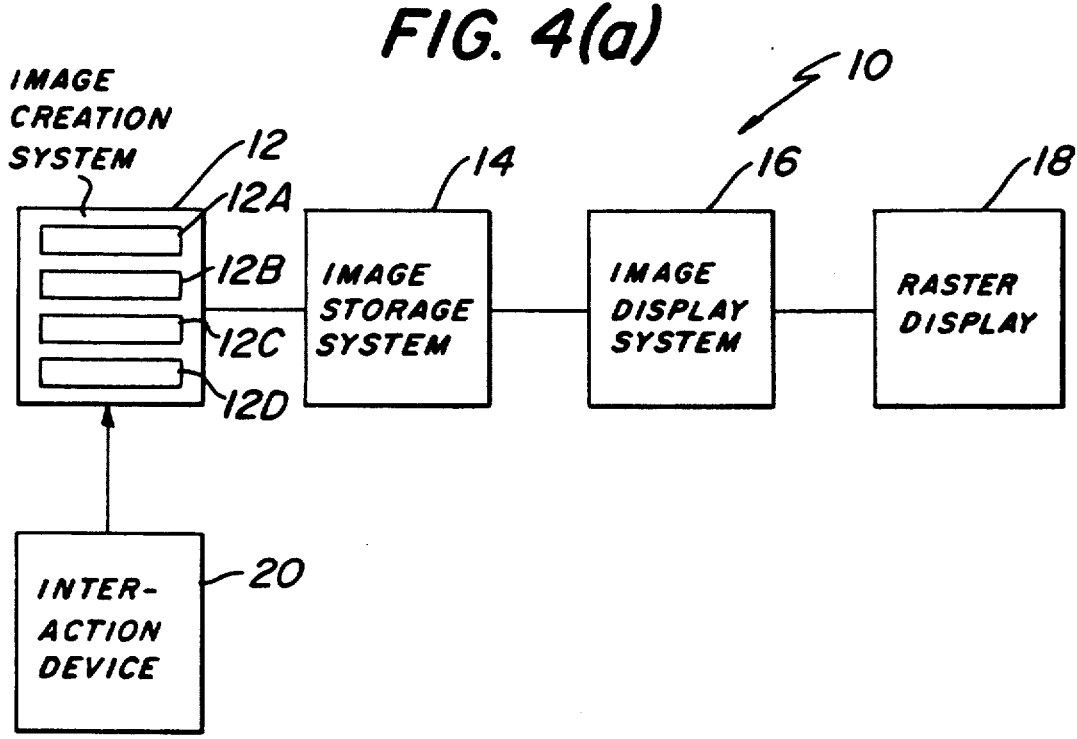
FIG. 4(a) is a block diagram of a multi-processor raster-scan graphics system in accordance with the present invention.

FIG. 4(a) depicts a multi-processor graphics system in accordance with the present invention. The only difference between the block diagrams of FIGS. 1 and 4(a) is that the image creation system 12 of FIG. 4(a) includes a plurality of pixel processors 12A through 12D. In a preferred embodiment, processors 12A-12D are each a Color Texture Interpolator, part no. IFY5-0001, manufactured by Hewlett Packard Co., Palo Alto, Cali. As described below, the present invention provides an efficient algorithm for rendering antialiased vectors. Moreover, the algorithm is particularly adapted to be carried out by multiple processors operating in parallel.

Figure 2:
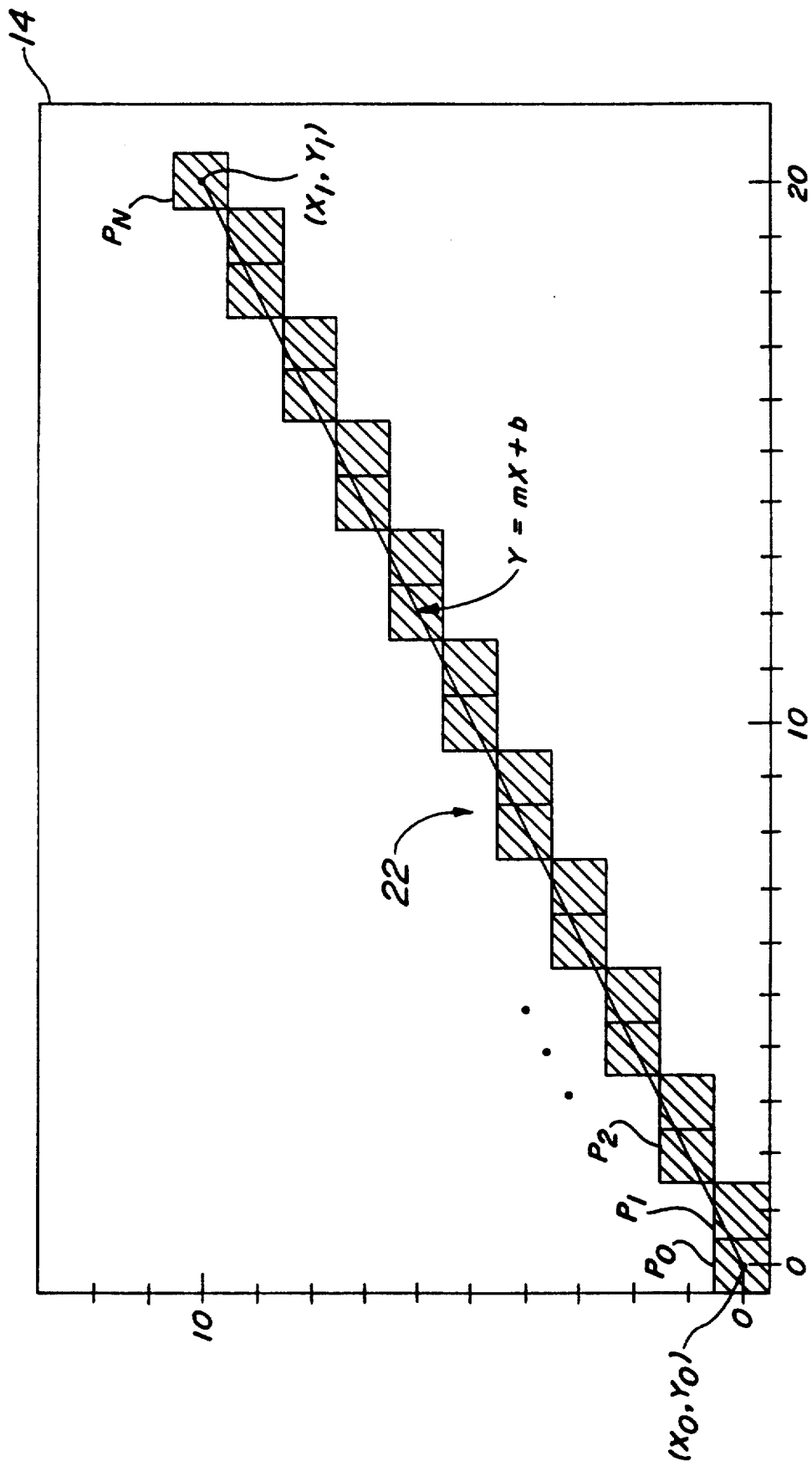
FIG. 2 is a simplified representation of an aliased vector.
Figure 4B:
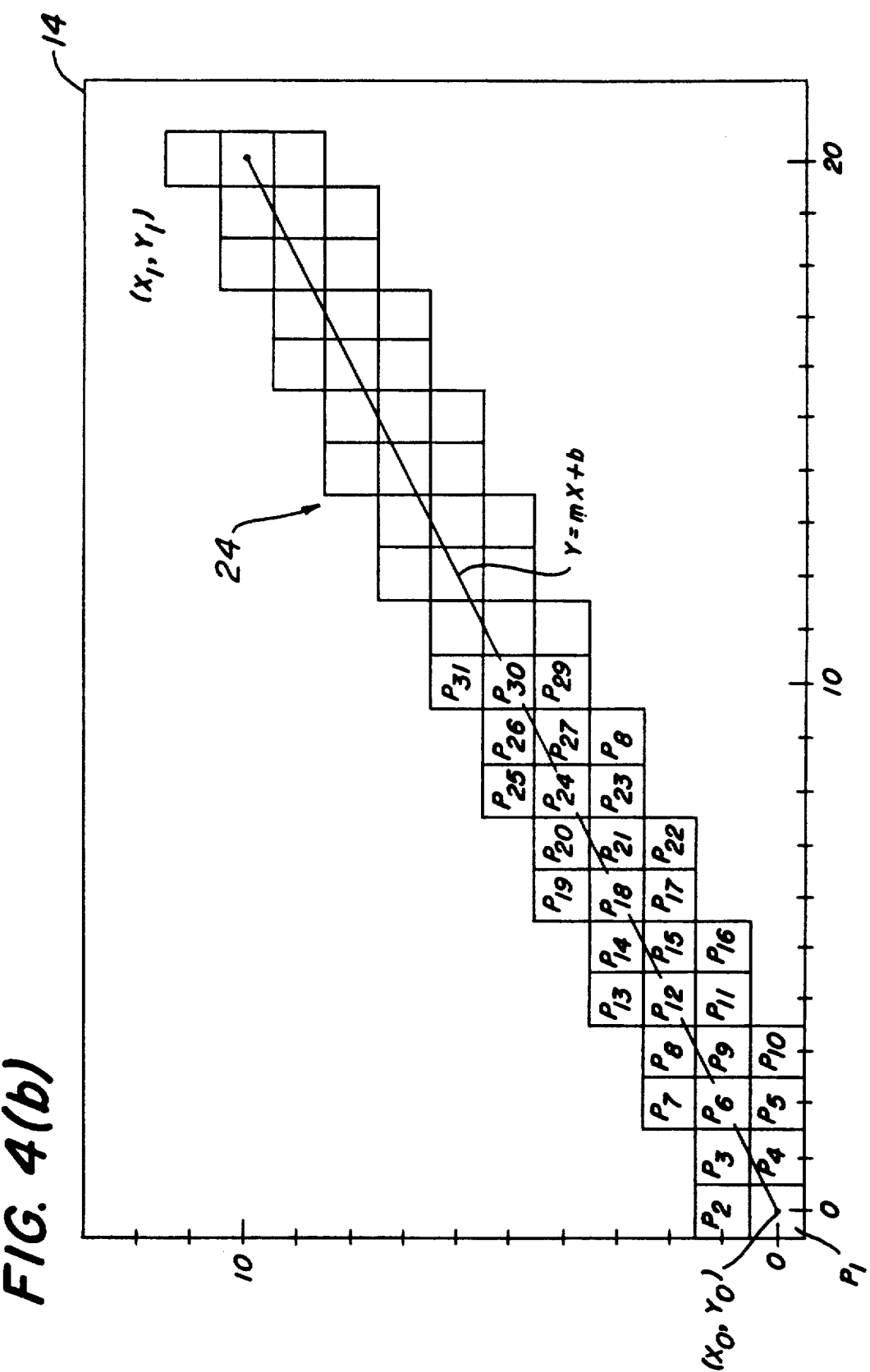
FIG. 4(b) is a simplified representation of an antialiased vector rendered in accordance with the present invention.

FIG. 4(b) depicts an antialiased vector 24 corresponding to the line $y=mx+b$ from the point ($X_0=0$, $Y_0=0$) to the point ($X_1=20$, $Y_1=10$). This is the same line represented in FIG. 2 by the aliased vector 22. The antialiased vector 24 is preferably composed of three pixels for each major axis step. Vector 24 has a major axis in the horizontal (X) direction and a minor axis in the vertical (Y) direction. Vector 24 is rendered at each major axis step, beginning at the first major axis step $X_0$, by rendering groups of three pixels along the minor axis. The Y ordinate of the middle pixel in each group of three pixels corresponds as nearly as possible to the line $y=mx+b$. As with the aliased vector 22 discussed above, there will still be some error due to the limited number of storage pixels in the frame buffer and the limited number of display pixels.

According to the invention, the smoother appearance of antialiased vector 24 is achieved by tapering the intensity distribution of the display pixels along the vector minor axis (Y-axis). For example, one such scheme is to assign all pixels centered exactly on the line $y=mx+b$ (e.g., $P_1$, $P_{30}$) a peak intensity, and assign its neighboring pixels along the minor axis an intensity less than the peak intensity. A set of pixels centered below (above) the line (e.g., $P_8$, $P_9$, $P_{10}$) is assigned an intensity distribution weighted more heavily above (below) the line. There are many possible intensity distribution functions that would achieve a satisfactory result, however the Hamming function (a modification of the Sinc function ($\sin X/X$)) is most preferred.

Antialiased vector 24 is preferably rendered by first rendering pixel $P_1$, then $P_2$, then $P_{34}$, then $P_4$ and so on, in the order shown. Note that, at each new major axis step, the rendering order along the minor axis changes direction. For example, at the first major axis step, $P_1$ and $P_2$ are rendered in the positive minor axis direction, while at the second major axis step $P_3$ and $P_4$ are rendered in the negative minor axis direction.

In order to take full advantage of modern VLSI parallel processing technology, a parallel processor algorithm for vector generation was developed. The algorithm efficiently matches a hardware implementation with an image space sub-division. The algorithm provided by the present invention (the Barkans algorithm) may be contrasted with the well known Bresenham algorithm (see, Bresenham, J. "Algorithm For Computer Control Of A Digital Plotter," *IBM Systems Journal* 4(1) July 1965) for single processor systems, which automatically step along the major axis and check whether the minor axis should be adjusted. Unlike the situation in single processor systems, the efficient use of multiple processors requires that while each pixel is being processed the position of the next pixel for each processor be determined by that processor. This decouples the processors so that they can proceed independently. Since this is a more complex algorithm, it requires more logic than the Bresenham algorithms. The additional logic circuitry required is relatively inexpensive, given modern VLSI technology.

Before presenting the details of the algorithm, the required state information will be described. The state information may be provided by an external source (e.g., a host processor) and/or the data sent to describe each individual vector. The embodiment described below supports one, two or four processors with an image space subdivision along scan lines; however the invention is not limited to systems with any particular number of processors or to image space subdivision along scan lines.

The signals S0-S3 tell a processor which of the scan lines, 0-3 (MOD 4), it "owns", i.e., is responsible for. Note that the scan lines identified by the signals S0-S3 may be either screen relative or window relative.

In addition to the S0-S3 signals, three configuration bits are used to produce a set of logical signals. These signals are called 4_PP, 2_PP and STEP_CONTROL. 4_PP is asserted if the current processor owns one of every four scan lines in a four processor configuration. 2_PP is asserted if the processor is part of a two processor configuration. STEP_CONTROL is asserted if the current processor is part of a one or two processor configuration.

The signal Y_MAJOR is asserted if the major axis of the vector being rendered is the Y-axis, and not asserted if X is the major axis.

The SERP signal causes the vector to be rendered in serpentine mode. Serpentine mode is a way to specify the output order of the pixels. (This serpentine mode is distinguished from the serpentine rendering of antialiased vectors, discussed above, whereby a number of pixels are sequentially rendered along the minor axis for each major axis step.) If the pixels along one scan line are output with incrementing x values, then the pixels for the adjunct scan line are output by decrementing the x values. This ordering is done to improve locality (i.e., reduce the number of addresses required to be sent to the frame buffer) and thus increase throughput into the frame buffer. The SERP signal is initially set to the value of the sign bit of the vector's slope, and is thereafter toggled at each major axis step.

The MAJ_DEC signal is asserted if the major axis should be decremented for each major axis step.

If the AA_MODE signal is asserted, an antialiased vector is rendered. If AA_MODE is not asserted, an aliased vector will be rendered.

The MIN_1 and MIN_0 signals represent the least significant bits of the minor axis position. These are used by a processor to determine the location of the pixels it is responsible for.

Two signals, MAJ_1 and MAJ_0, are the least significant bits of the major axis position. These are used by a processor to determine the location of the pixels it is responsible for.

Figure 5:
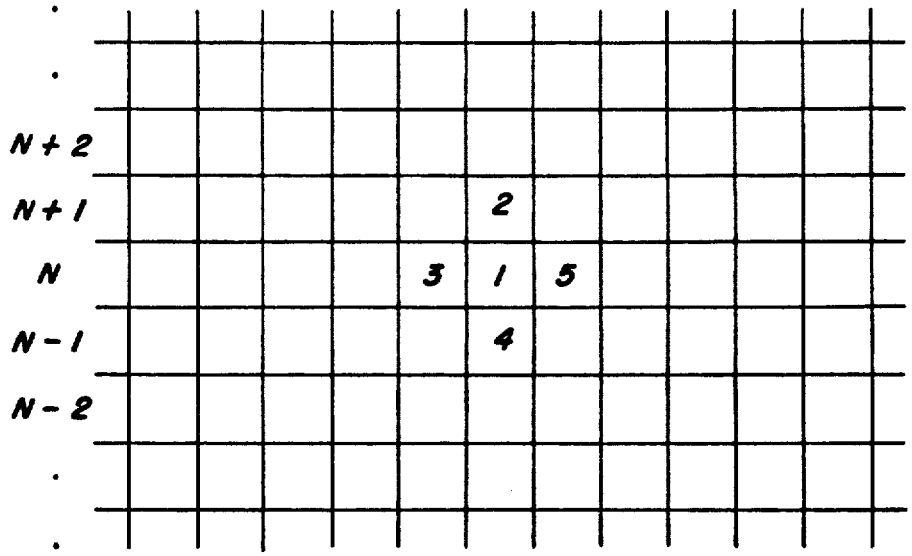
FIG. 5 depicts alternative positions of a first rendered pixel for a major axis step, in accordance with the present invention.

FIG. 5 shows the positions where the pixels for a major axis step may be located. The grid represents pixel locations on a CRT display. Note that the image space is subdivided along scan lines such that in a four processor system each processor is responsible for every fourth scan line. The figure assumes that the current major and minor axis values point to the pixel location shown as "1". For an aliased vector only, pixel 1 is rendered at the current major axis step. A Y-major antialiased vector requires that the processor responsible for scan line N render the pixels designated 3, 1 and 5. An X-major antialiased vector requires the pixels designated 2, 1 and 4 be rendered. In a four processor system a different processor renders each of three pixels required for the major axis step of the X-major antialiased vector (this assumes that the antialiased vector comprises three pixels for each major axis step, which is most preferred).

The selection of which pixel to render first is based on the following criteria:

The pixel at location 1 would be the first pixel rendered if:

1. The mode is aliased and the processor owns scan line N; or 2. if the mode is antialiased, the vector is X-major, it is a two or four processor system, and the processor owns scan line N.

The pixel at location 2 would be the first pixel rendered if the mode is antialiased, the vector is X-major, and the processor owns scan line (N+1). The SERP signal must also be asserted unless the processor is part of a four processor system, in which case the SERP signal may be ignored.

Pixels at location 3 or 5 would be rendered first if the mode is antialiased, the vector is Y-major and the processor owns scan line N. The choice of which pixel, 3 or 5, to render first depends on the state of the SERP signal.

The last possible case is that no pixel is rendered for the current major axis step. This would occur if:

1. A pixel on scan line N that is part of an aliased X-major vector is evaluated by a processor that does not own scan line N;

2. a Y-major vector is being rendered and the current major axis location is not on a scan line owned by the processor; or 3. an antialiased X-major vector is being rendered by a system with four processors and the processor of interest owns scan line (N+2). Note that in a four processor system the processor that owns scan line (N+2) does not own another scan line until line (N-2) or (N+6).

Thus, it can be seen that at each major axis step a determination must be made whether the minor axis value of the first pixel rendered should be incremented, decremented, or held. From FIG. 5 it can be seen that positions 2 and 5 are increments along the minor axis, and positions 3 and 4 are decrements along the minor axis. To stay at position 1 the minor axis is held.

Using the given state information, a set of Boolean expressions for the signals "Increment", "Decrement" and "Hold" can be derived. For example, the Boolean expression for Increment may be written as follows:

$$\begin{aligned}
\text{Increment} = & [[[(\overline{MIN\_1}\cdot\overline{MIN\_0})\cdot S1) + ((\overline{MIN\_1}\cdot MIN\_0)\cdot S2) + \\
& ((MIN\_1\cdot\overline{MIN\_0})\cdot S3) + ((MIN\_1\cdot MIN\_0)\cdot S0)]\cdot \\
& \overline{Y\_MAJOR}\cdot AA\_MODE\cdot [SERP + 4\_PP]] + \\
& [[(\overline{MAJ\_1}\cdot\overline{MAJ\_0})\cdot S0) + ((\overline{MAJ\_1}\cdot MAJ\_0)\cdot S1) + \\
& ((MAJ\_1\cdot\overline{MAJ\_0})\cdot S2) + ((MAJ\_1\cdot MAJ\_0)\cdot S3)] \\
& Y\_MAJOR\cdot AA\_MODE\cdot SERP]]
\end{aligned}$$

The equations for "Decrement" and "Hold" can be derived in a similar fashion. See A. C. Barkans, "High Speed High Quality Antialiased Vector Generation," referenced above.

After determining the position of the first pixel to render, a determination must be made whether there are other pixels to render along the minor axis. If the vector is Y-major and Increment or Decrement are true, then there are more pixels to render along the minor axis. Referring to FIG. 5, this condition implies that a pixel at position 3 or 5 was rendered first. In that case, the other two pixels must be rendered along the scan line. The other case where there are more pixels along the minor axis is when an X-major vector is rendered and the processor is part of a one or two processor system and the first pixel required an increment or decrement.

A Boolean expression may be written for Minor_Step as follows:

$$\begin{aligned}
\text{Minor\_Step} = & [(\text{Increment} + \text{Decrement})\cdot Y\_MAJOR] + \\
& [(\text{Increment} + \text{Decrement})\cdot \\
& \text{STEP\_CONTROL}\cdot \overline{Y\_MAJOR}]
\end{aligned}$$

Pseudo code describing the preferred embodiment of the algorithm is shown below. Note that this embodiment will work for one-, two- and four-processor systems. In addition, note that the symbols "*" and "+" represent the logical operations "AND" and "OR", respectively; and that steps enclosed within brackets "{ }" are performed within a single clock cycle. The ability of a given processor to perform a number of steps within a single clock cycle is important to the overall speed with which the algorithm can be carried out. The circuitry for achieving this parallelism within a processor will be apparent to those skilled in the art. See, A. C. Barkans, "High Speed High Quality Antialiased Vector Generation," referenced above; W. Newman and R. Sproull, *Principles of Interactive Computer Graphics*, p. 24, 2nd ed. McGraw-Hill, New York, 1979.

```
Vector(vector_modes,major_start,major_count,minor_start,
    minor slope)
    /*vector_modes: includes bits for: AA_MODE,
    MAJ_DEC,Y_MAJOR,
    major_start: a 16 bit integer, location of first major axis
    step
    major_count: a 16 bit integer, number of steps along major
    axis
    minor_start: a 16.16 format number, location vector crosses
    first major axis position
    minor_slope: a 2.16 format number, (1 sign bit, 1 bit for 45
    degrees, and the fractional bits)*/
begin
Initialize_Register_Set;
While(major_count> =0 {
    Move_Next_Major_to_Current;/*move data from
    shadow registers to current registers*/
    IF(Increment + Decrement + Hold) {
        out_first_pixel;
    }
    adjust_major;  /*adjust shadow registers to next major
                axis location*/
    major_count = major_count - 1;
    If(Minor_Step) {   /*will only be true for some AA
    vectors*/
        If(NOT[Y_MAJOR*2_PP) {
            out_second_pixel;
        }
        If(Y_MAJOR*(4_PP_2_PP)) { /*look ahead,
        for next major axis location, if possible */
            adjust_major; /*adjust shadow registers
to next major axis location */
            major_count = major_count-1;
        }
        out_third_pixel;
        If(Y_MAJOR*4_PP) { /*look ahead, for next
            major axis location, if possible */
        adjust_major; /*adjust shadow registers to
        next major axis location */
        major_count = major_count - 1;
        }
    }
}
END
```

There are several points to note about this algorithm:

First, if aliased vectors are being rendered, then the signals Increment, Decrement and Minor_Step cannot be asserted. In the aliased case the "while" loop becomes very much like the inner loop of a DDA algorithm, with one noticeable exception: in a multi-processor configuration the Hold signal will only be asserted when the processor owns the scan line.

In addition, in a four processor configuration with Y-major antialiased vectors, the major axis will be stepped ahead while rendering across the minor axis. The result is that in three clock cycles three minor axis pixels will be rendered and the major axis stepped ahead to the next scan line the respective processor is responsible for.

Finally, in a four processor configuration with X-major antialiased vectors, the Increment, Decrement and Hold signals will make the processor render the correct minor axis pixel on the first clock. The Minor_Step signal will not be asserted. The combined processing of the four processors will result in one major axis step rendered in every clock cycle. Aliased vectors also require one clock cycle to step a major axis step. See A. C. Barkans, "High Speed High Quality Antialiased Vector Generation," referenced above, for additional points regarding the above algorithm.

Figure 6B:
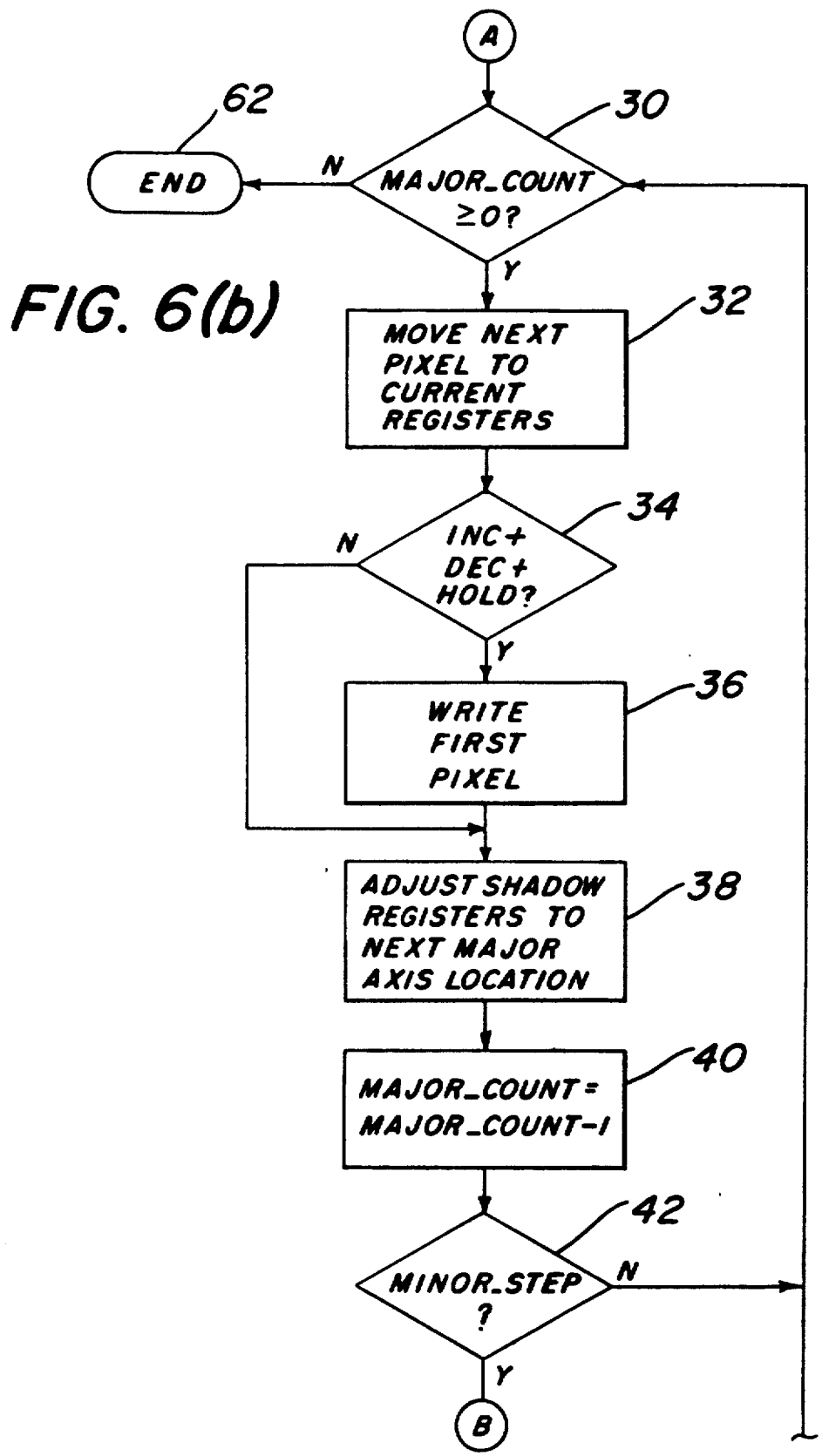
Figure 6C:
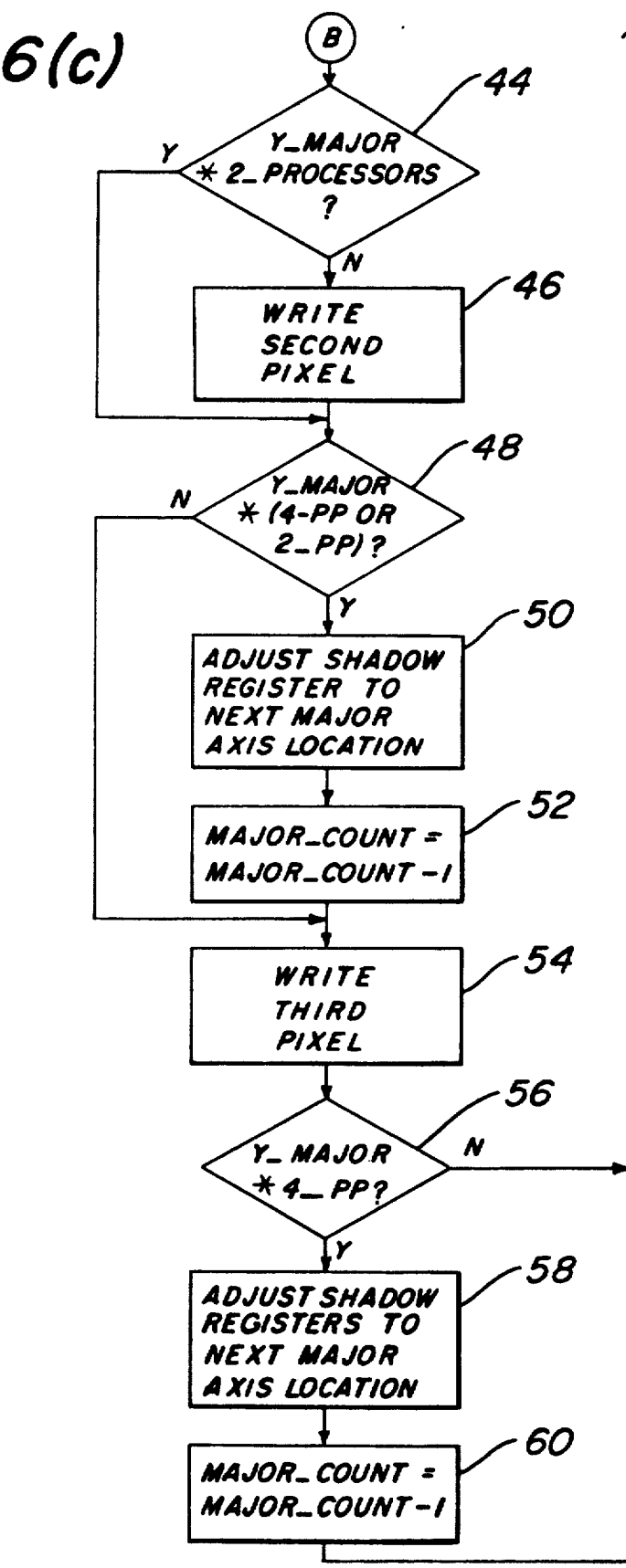

Referring now to FIGS. 6(a)–6(c), a flowchart of the above scan conversion algorithm is depicted. The preferred embodiment of the algorithm includes the step of first determining the state variables discussed above and represented by the signals listed in block 28.

Next, a check is made of whether "major_count" is greater than or equal to zero, block 30. If less than zero, the algorithm is ended, block 62. If major_count is greater than or equal to zero, the next pixel value is moved into a register called the "current" register, block 32.

Next, a check is made of whether Increment, Decrement, or Hold are true, block 34. If any one of them is true, the first pixel is written to the frame buffer, block 36. If none of them are true, or after rendering the first pixel, the "shadow register" is adjusted to the next major axis location, block 38. Note that the "shadow register" and "current register" are coupled together in series in a pipelined implementation of the invention. These registers allow the respective processors to "look ahead," and compute a next pixel location while current pixel is being rendered.

Next, major_count is decremented by 1, block 40. Next, minor_step is checked to determine whether it is true, block 42. If not true, the algorithm loops back to block 30. If true, a check is made of whether Y_major *2_PP is true, block 44. If not true, the second pixel along the minor axis is written, block 46.

Next Y_major*(4_PP+2_PP) is tested, block 48. If true, the shadow register is set to the next major axis location, block 50, and major_count is decremented by 1, block 52.

Next, the third pixel value is written to the frame buffer, block 54. Next, Y_major*4_PP is tested, block 56. If Y_major*4_PP is not true, the algorithm loops back to block 30. If Y_major*4_PP is true, the shadow register is adjusted to the next major axis location, block 58. Finally, major_count is decremented by 1, block 60, and the algorithm loops back to block 30.

Note that although the flowchart and corresponding description reflect the parallelism between processors, they may fail to bring out that many of the steps may also be performed in parallel by the individual processors. The degree of parallelism within a processor is dependent upon the particular circuitry employed to carry out the algorithm, which circuitry is subject to an infinite variety of variations and modifications.

As a final point, it is noted that many other variations and modifications of the method and apparatus described above will be apparent to those skilled in the art. For example, the specific number of pixels for each major axis step, and the particular antialiasing filter employed may vary from the preferred embodiments described above without departing from the scope of the invention. Accordingly, the invention is intended to be limited only by the following claims.

What is claimed is:

1. In a computer graphics system including a plurality of processors, a scan conversion method for rendering an antialiased vector for display on a raster-scan display that scans in a predefined X direction perpendicular to a predefined Y direction, the method comprising the steps of:
   (a) providing signals to said processors indicating to each processor a respective display area for which the processor is responsible, each display area corresponding to at least a scan line of said raster-scan display;
   (b) determining a first set of storage pixels to be rendered by said processors, said first set containing at least a first storage pixel to be rendered in a first display area and a second storage pixel to be rendered in a second display area, and rendering each storage pixel of said first set in parallel; and
   (c) determining a second set of storage pixels to be rendered by said processors, said second set containing at least a third storage pixel to be rendered in said first display area and a fourth storage pixel to be rendered in said second display area, and rendering each storage pixel of said second set in parallel, wherein said determinations of said first and second sets of storage pixels are made in accordance with said signals and wherein, int h case of an X-major vector, each of said pixels in said first set corresponds to a single major axis step and, in the case of a Y-major vector, each of said pixels in said first set corresponds to a different major axis step.

2. The method for rendering an antialiased vector recited in claim 1, wherein said second set of pixels corresponds to a different major axis step than said first set of pixels.

3. The method for rendering an antialiased vector recited in claim 2, wherein said first set of pixels comprises three pixels each of which corresponds to a different minor axis step.

4. The method for rendering an antialiased vector recited in claim 3, wherein at least two of said first set of pixels along the minor axis are assigned different values.

5. The method recited in claim 4, further comprising the step of displaying data rendered in said storage pixels on a raster-scan display.

6. The method for rendering an antialiased vector recited in claim 1, wherein said second set of pixels corresponds to a different minor axis step than said first set of pixels.

7. The method for rendering an antialiased vector recited in claim 6, further comprising the step of determining a third set of storage pixels to be rendered by said processors, and rendering each of said third set of pixels in parallel by a different one of said processors, each of said third set of pixels corresponding to a different minor axis step than said first and second sets of pixels.

8. The method for rendering an antialiased vector recited in claim 7, wherein pixels corresponding to a single major axis step but different minor axis steps are assigned at least two different values.

9. The method recited in claim 8, further comprising the step of displaying data rendered in said storage pixels on a raster-scan display.

10. In a multi-processor computer graphics system, a scan converter for rendering an antialiased vector to a frame buffer operatively coupled to a raster-scan display that scans in a predefined X direction perpendicular to a predefined Y direction, the scan converter comprising:
  (a) a plurality of processors;
  (b) means for providing signals to said processors indicating to each processor a respective display area for which the processor is responsible, each display area corresponding to at least a scan line of said raster-scan display;
  (c) means for determining a first set of storage pixels to be rendered by said processors, said first set containing at least a first storage pixel to be rendered in a first display area and a second storage pixel to be rendered in a second display area, and means for rendering each storage pixel of said first set in parallel; and
  (d) means for determining a second set of storage pixels to be rendered by said processors, said second set containing at least a third storage pixel to be rendered in said first display area and a fourth storage pixel to be rendered in said second display area, and means for rendering each storage pixel of said second set in parallel, wherein said determinations of said first and second sets of storage pixels are made in accordance with said signals and wherein, in the case of an X-major vector, each of said pixels in said first set corresponds to a single major axis step and, in the case of a Y-major vector, each of said pixels in said first set corresponds to a different major axis step.

11. The scan converter recited in claim 10, wherein said second set of pixels corresponds to a different major axis step than said first set of pixels.

12. The scan converter recited in claim 11, wherein said first set of pixels comprises three pixels each of which corresponds to a different minor axis step.

13. The scan converter recited in claim 12, further comprising means for assigning at least two of said first set of pixels along the minor axis different values.

14. The scan converter recited in claim 13, further comprising means for displaying data rendered in said storage pixels on a raster-scan display.

15. The scan converter recited in claim 10, wherein said second set of pixels corresponds to a different minor axis step than said first set of pixels.

16. The scan converter recited in claim 15, further comprising means for determining a third set of storage pixels to be rendered by said processors, and means for rendering each of said third set of pixels in parallel by a different one of said processors, each of said third set of pixels corresponding to a different minor axis step than said first and second sets of pixels.

17. The scan converter recited in claim 16, further comprising means for assigning pixels corresponding to a single major axis step but different minor axis steps at least two different values.

18. The scan converter recited in claim 17, further comprising means for displaying data rendered in said storage pixels on a raster-scan display.

19. A multi-processor computer graphics system, comprising:
  (a) image creation means for rendering an image composed of at least one antialiased vector, said vector represented by a plurality of storage pixels, said image creation means comprising:
    (i) a plurality of parallel processors for rendering said vector;
    (ii) means, coupled to said parallel processors, for providing signals indicative of a scan line to the respective processor responsible for that scan line;
    (iii) means, coupled to each of said parallel processors, for determining in accordance with said signals a first set of storage pixels to be rendered by said processors, and for rendering each pixel of said first set in parallel by a different one of said processors; and
    (iv) means, coupled to each of said processors, for determining in accordance with said signals a second set of storage pixels to be rendered by said processors, and for rendering each of said second set of pixels in parallel by a different one of said processors;
  (b) frame buffer means comprising said storage pixels for storing pixel data rendered by said image creation means; and
  (c) a raster-scan display, coupled to said frame buffer means, for displaying pixel data stored in said frame buffer means.

20. The system recited in 19, wherein each of said pixels in said first set corresponds to a single major axis step.

21. The system recited in claim 20, wherein said second set of pixels corresponds to a different major axis step than said first set of pixels.

22. The system recited in claim 21, wherein said first set of pixels comprises three pixels each of which corresponds to a different minor axis step.

23. The system recited in claim 22, further comprising means for assigning at least two of said first set of pixels along the minor axis different values.

24. The system recited in claim 19, wherein each of said pixels in said first set corresponds to a major axis step.

25. The system recited in claim 24, wherein said second set of pixels corresponds to a different minor axis step than said first set of pixels.

26. The system recited in claim 25, further comprising means for determining a third set of storage pixels to be rendered by said processors, and means for rendering each of said third set of pixels in parallel by a different one of said processors, each of said third set of pixels corresponding to a different minor axis step than said first and second sets of pixels.

27. The system recited in claim 26, further comprising means for assigning pixels corresponding to a single major axis step but different minor axis steps at least two different values.

* * * * *